United States Patent [19]
Evans et al.

[11] 3,844,677
[45] Oct. 29, 1974

[54] BLUNTED LEADING EDGE FAN BLADE FOR NOISE REDUCTION

[75] Inventors: Robert C. Evans; Donald K. Dunbar, both of Cincinnati, Ohio

[73] Assignee: General Electric Company, Cincinnati, Ohio

[22] Filed: July 5, 1973

[21] Appl. No.: 376,546

Related U.S. Application Data

[62] Division of Ser. No. 194,285, Nov. 1, 1971, abandoned.

[52] U.S. Cl.................... 416/84, 416/90, 416/228, 415/119
[51] Int. Cl............................................. F01d 5/16
[58] Field of Search ............... 416/90, 228, 84, 23; 415/DIG. 1, 119, 195

[56] References Cited
UNITED STATES PATENTS

| | | | |
|---|---|---|---|
| 2,149,510 | 3/1939 | Darrieus | 415/DIG. 1 |
| 2,783,008 | 2/1957 | Bodine | 415/DIG. 1 |
| 2,918,978 | 12/1959 | Fanti | 416/84 |
| 3,305,215 | 2/1967 | Swiecicki et al. | 415/119 X |
| 3,347,520 | 10/1967 | Owczarek | 415/119 |
| 3,572,960 | 3/1971 | McBride | 415/119 |
| 3,611,724 | 10/1971 | Kutney | 415/119 X |
| 3,614,260 | 10/1971 | Ellinger | 416/23 |

FOREIGN PATENTS OR APPLICATIONS

| | | | |
|---|---|---|---|
| 1,456,065 | 8/1969 | Germany | 416/97 |

*Primary Examiner*—Everette A. Powell, Jr.
*Attorney, Agent, or Firm*—Derek P. Lawrence; Lee H. Sachs

[57] ABSTRACT

A turbomachinery rotor blade includes a leading edge with a blunted contour over at least a portion of the radial length thereof. The blunting is accomplished in a variety of ways, such as by removing material from a portion of the leading edge, by blowing air into the leading edge or by positioning a mechanical device such as an inflatable boot around a portion of the leading edge. The aerodynamic or mechanical blunting can be utilized during selective portions of flight, such as take-off and landing. The blunted leading edge provides significant reduction in noise generated during rotation of the turbomachinery rotor blade.

2 Claims, 7 Drawing Figures

PATENTED OCT 29 1974    3,844,677
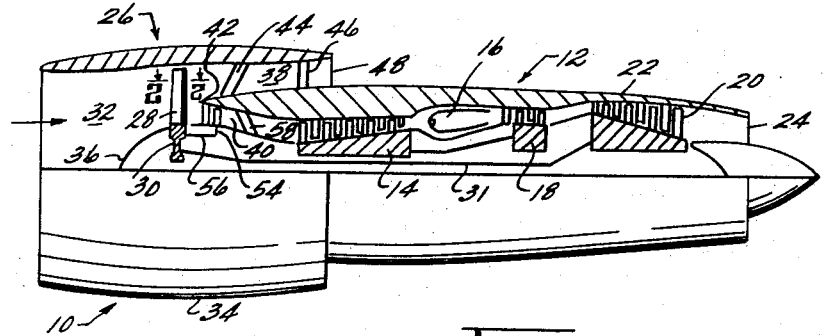
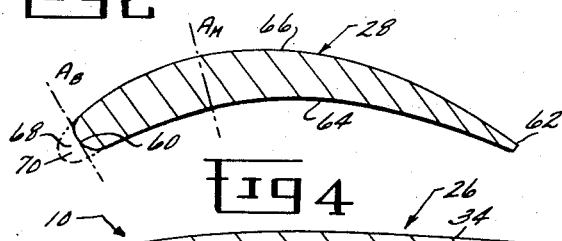
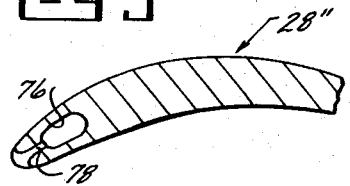
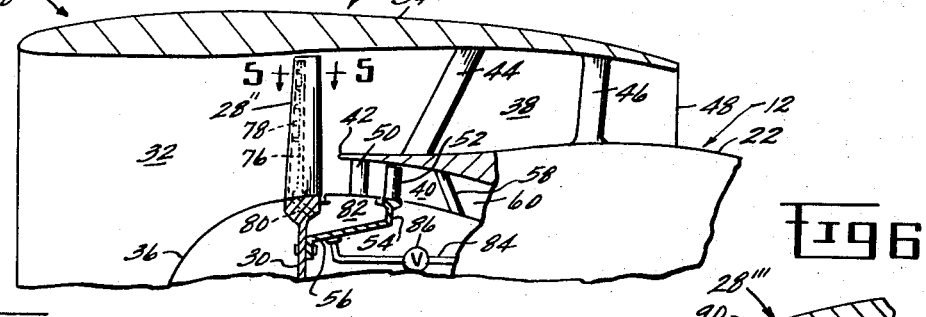
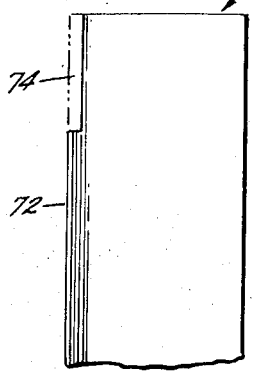
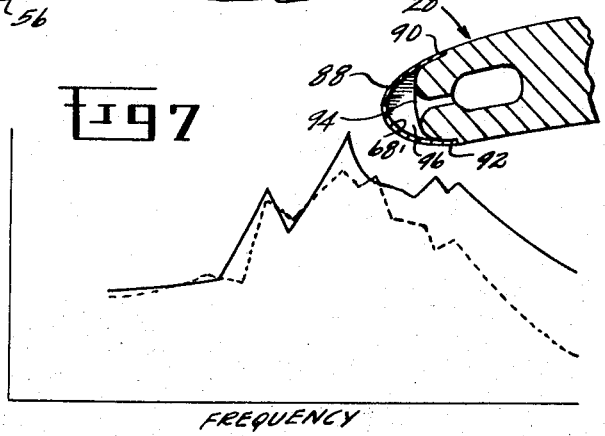

BLUNTED LEADING EDGE FAN BLADE FOR NOISE REDUCTION

This is a divisional application of application Ser. No. 194,285, filed Nov. 1, 1971, now abandoned and assigned to the assignee of the present invention.

BACKGROUND OF THE INVENTION

This invention relates generally to gas turbine engine noise reduction devices and, more particularly, to such an engine which includes turbomachinery rotor blades having leading edges which are contoured or otherwise altered to reduce the noise generated by such blades.

A vast amount of effort has been expended in recent years by gas turbine engine manufacturers and aircraft manufacturers in efforts to reduce the noise levels associated with aircraft gas turbine engines. This work has included both effort toward suppressing noise generated by the engines with suppression devices such as acoustic panels positioned within the inlets and exhaust passageways of the engine, and also has included effort toward reducing the noise generation per se by means such as proper blade-vane spacing, proper blade lean, etc.

The advent of high bypass ratio, large diameter turbofan engines, which power the new wide body jets, has resulted in a generation of gas turbine engines in which the noise produced by the large diameter fan greatly exceeds and shadows the noise produced by a core engine which drives the fan. While the overall noise levels of these engines have been greatly reduced when compared to prior generations turbojets, any design innovation which would significantly reduce noise generation of the fan without significantly altering the basic structure of the engine would greatly enhance the saleability of such an engine. This is true because the reduction in noise generation would permit either further reduction of the overall noise level of the engine or would permit the elimination of the added weight and cost associated with a noise reduction panel previously used to maintain the engine at a certain noise level.

SUMMARY OF THE INVENTION

It is an object of the present invention therefore to provide a turbomachinery rotor blade which reduces the noise generated by a turbofan engine.

Briefly stated, the above and similarly related objects are accomplished by providing a blade for a gas turbine engine which includes a leading edge with a blunted contour over at least a portion of the radial length thereof. That is, the basic aerodynamic contour of the leading edge is made blunt or flatter than normal. The blunting may be accomplished in a variety of ways, such as by removing material from at least a portion of the leading edge, by blowing air into the leading edge, or by positioning a mechanical device such as an inflatable boot around a portion of the leading edge.

DESCRIPTION OF THE DRAWINGS

While the specification concludes with a series of claims which particularly point out and distinctly claim the subject matter which Applicants consider to be their invention, a complete understanding of the invention will be gained from the following detailed description, which is given in connection with the accompanying drawing, in which:

FIG. 1 is a partially schematic view of a typical high bypass, large diameter turbofan engine;

FIG. 2 is a cross-sectional view of a tubofan blade, taken along line 2—2 of FIG. 1;

FIG. 3 is a perspective view of a blade similar to that shown in FIG. 2;

FIG. 4 is an enlarged partial, sectional view of a turbofan engine showing an alternative noise reduction embodiment;

FIG. 5 is a partial cross-sectional view taken along line 5—5 of FIG. 4;

FIG. 6 is a partial, cross-sectional view of an alternate configuration of a turbofan blade; and FIG. 7 is a graphic plot of a noise signature of a typical turbofan engine showing the effects of the present invention.

DESCRIPTION OF THE PREFERRED EMBODIMENTS

Referring now to the drawing wherein like numerals correspond to like elements throughout, reference is directed initially to FIG. 1 wherein a gas turbine engine 10 of the high bypass, front fan type is shown to include a core engine 12, which is essentially a turboshaft engine in that it includes a compressor 14, a combustor 16, a gas generator turbine 18 for driving the compressor 14, and a power turbine 20 arranged in axially spaced serial flow relationship. The inner turbomachine, or core engine 12, is enclosed within a cylindrical casing 22 which terminates at its downstream end in an exhaust nozzle 24 through which the combustion products of the core engine 12 may be discharged to produce thrust. To provide additional thrust, a fan 26 is mounted upstream of the core engine 12 and is driven by the power turbine 20. The fan 26 is comprised of a plurality of fan blades 28 which extend radially from a fan wheel 30, which is coupled for rotation to the power turbine 20 by means of a shaft 31. The fan blades 28 extend radially across a bypass duct or passageway 32 defined between an outer cylindrical casing 34 and a "bullet nose" 36 located upstream of the fan blades 28.

Downstream of the fan blades 28, the passageway 32 is divided into passages 38 and 40 by a splitter platform 42. Radially positioned between the casing 34 and the splitter platform 42 are a plurality of fan stator vanes 44, which are followed by a plurality of fan outlet guide vanes 46. Thus, a portion of the air flow entering passageway 32 flows through the fan blades 28, into the passageway 38, through the stator vanes 44 and through the outlet guide vanes 46. This portion of the air flow thereafter exits through an outlet opening 48 formed between the casing 34 and the casing 22. Since this air is pressurized in flowing through the fan blades 38, it provides additional forward thrust to the turbofan engine 10.

The remainder of the air flowing through the passageway 32 and the fan blades 28 enters the passageway 40. As shown most clearly in FIG. 4, located within this passageway 40 are a plurality of inlet guide vanes 50 for the core engine 12. Downstream of the inlet guide vanes 50 are a plurality of rotatable compressor blades 52, which extend from a compressor disc 54 and are coupled for rotation with the fan blades 28 by means of the disc 54 and a shaft 56. Located downstream of the compressor blades 42 is a row of stator vanes 58. Air passing through the stator vanes 58 flows into the core engine 12.

One characteristic of every high bypass ratio turbofan engine is that the diameter of the bypass fan is much larger than the diameter normally associated with a compressor or turbine section of the core engine. Because of this large diameter, the rotation of the fan 26 may result in high noise levels unless some provision is made for reducing the intensity of noise generated by such a fan. The present invention relates to a fan blade design which reduces the noise level associated with rotation of the large diameter fan. It will become obvious to those skilled in the art, however, that the presently disclosed concept can be applied to any size blade for noise reduction purposes.

As shown in FIG. 2, the fan blade 28 includes a cross sectional of airfoil shape having a leading edge 60, a trailing edge 62, a pressure or concave surface 64 and a suction or convex surface 66. The fan blade 28 is a typical airfoil cross section with the exception that a certain portion of material has been removed from the leading edge. That is, the leading edge 60 which would normally be associated with an airfoil section having the pressure surface 64 and the suction surface 66 shown in FIG. 2 would extend as shown by the phantom lines 68. Said another way, the normal aerodynamic contour of the leading edge has been flattened by removal of the material from the area designated by the numeral 70 in FIG. 2.

The exact amount of blunting required would vary depending upon the particular blade design and the application, but values of B between ten and fifty percent would appear to be the most promising from a noise reduction standpoint. (The degree of blunting could also be defined in terms of maximum cross-sectional area over blunted leading edge area with the areas being defined as a thickness times a unit height.)

As shown in FIGS. 1 and 2, the blunting of the leading edge of the fan blades 28 may extend over the entire radial length of the blade 28. In many applications, however, if may be desirable to provide a blade 28', as shown in FIG. 3, wherein a first portion 72 of the leading edge is constructed in normal fashion while a second portion 74 of the leading edge is blunted. That is, the blunting would extend only over the outer portion of the leading edge, e.g., the outer one-third of the radial height; while the remainder of the blade leading edge would be constructed to have a normal aerodynamic contour. A blade constructed in accordance with the design shown in FIG. 3 would minimize the performance losses that might be associated with the blade constructed as shown in FIGS. 1 and 2 and would still effect a significant reduction in noise generation.

Instead of physically removing material from the leading edge of the fan blade 26 as described in connection with FIGS. 1–3, the same noise reduction effects can be obtained by aerodynamically blunting the leading edge by injecting air into the leading edge of a blade constructed as shown in FIGS. 4 and 5. For this reason, a fan blade 28'' is shown to include a chamber 76 which extends along the radial length of the blade 228'' and is spaced a slight distance from the leading edge thereof (FIG. 5). A plurality of metering passages 78 are connected to the chamber 76 at various radial heights along the blade 28''.

As further shown in FIGS. 4 and 5, the metering passages 78 extend from the chamber 76 to the leading edge of the fan blade 28''. The passage 78 thus presents a path for the flow of fluid from the chamber 76 to the fan air stream through the leading edge of the fan blades 28''. In order to provide the chamber 76 with a suitable source of pressurized fluid, the fan wheel 30 is provided with a plurality of passageways 80 which are adapted to align with the chamber 76 when the fan blades 28'' are positioned within suitable openings in the periphery of the fan wheel 30 in a manner well known in the art.

The passageway 80 extends from the periphery of the wheel 30 to a face thereof which lies in fluid flow communication with a chamber 82 formed by the wheel 30, the disc 54, the shaft 56, and associated hardware as shown in FIG. 4. The chamber 82 is then pressurized with a suitable source of high pressure air such as fan discharge or compressor interstage bleed air. For this reason, tubing 84 extends from any suitable source of pressurizzed air to the chamber 82. The tubing 84 is provided with a valve 86 which permits selective pressurization of the chamber 82 for a purpose to be described.

As described above, blunting of the leading edge of the fan blades 28 effectively reduces the noise generated by rotation of the fan. As further described above, this blunting can be accomplished by removal of material from the leading edge of the fan blades 28. However, blunting of the leading edge not only effectively reduces noise levels but can have detrimental effects on performance of the fan. For this reason, it is desirable to provide a fan blade which includes a blunted leading edge during those portions of flight in which noise is considered to be most critical, i.e., take-off and landing approach, but which has a normal leading edge during the remaining portions of flight. The fan blade 28'' shown in FIGS. 4 and 5 includes such capabilities. That is, during take-off and landing approach the valve 86 would be opened such that the chamber 82, and thus the chamber 76 within the fan blades, would be pressurized. In this manner, high pressure air would flow through the metering passageways 78 and out the leading edge of the fan blade 28''. This efflux of pressurized air from the leading edge of the fan blades in a direction opposite that of the air flow within the fan duct 32 presents an effective blunted leading edge and causes noise reduction in much the same manner as does actual removal of material from the fan blade leading edge.

It should be obvious to those skilled in the art that the outlet of the metering passage 78 could take many shapes and yet effectively provide a blunted leading edge. For example, the outlet could be formed as an elongated slot extending over some radial distance or could be formed of a plurality of smaller circular holes at various spacings. Furthermore, as described in connection with FIG. 3, it may be necessary in many applications to provide metering passages only along the outer portion of the fan blades 28''. This, of course, would reduce the complexity and cost associated with construction of such a blade.

It should further be obvious to those skilled in the art that the blunt leading edge could also be provided by many mechanical means. For example, a leading edge 68' of a fan blade 28''' could be covered with a deformable member 88 as shown in FIG. 6. The member 88 would be connected to the blade 28''' in fluid sealing relationship at points 90 and 92 and at the top and bottom of the blade. At certain radial locations, the rigid material which forms the fan blade would be removed from the leading edge 68' to provide a surface 94 spaced a slight distance from the deformable member 88. Thus, at certain radial locations a small chamber 96 would exist between the deformable member 88 and the surface 94.

The flexible member 88 would be shaped in the form of a normal leading edge and would be made of material having sufficient rigidity to maintain this shape during cruise operation. During take-off and landing, however, the chamber 92 would be evacuated such that the member 88 is drawn back against the surface 94. In this manner, the member 88 would provide a blunt leading edge during that portion of the flight wherein noise reduction is desirable while providing a clean leading edge to eliminate detrimental performance effects during cruise operation. It should be obvious that similar effects could be gained by pressurizing the chamber behind the deformable member and thus expanding the member to provide a blunt contour.

FIG. 7 is a graphical plot of actual test data showing the noise reduction associated with blunting a leading edge in a manner similar to that shown in connection with FIGS. 1 and 2 above. Curve 1 is a one-third octave band plot of the sound pressure level of an engine having fan blades with a normal leading edge. Curve II is a similar plot of the sound pressure levels of an engine with a blunted leading edge fan blade wherein the transducer is located in the fan inlet. As can be seen from this graph, noise reduction of five to twelve SPL—$db$ were measured in this one-third octave band above 1250Hz. These noise reductions occurred in both the inlet and the fan nozzle and occurred within both the tone noise and the broad band noise.

While the actual mechanisms or aerodynamic phenomena which produce the noise reduction as a result of blunting the leading edge are not completely understood, at least two theories attempting to define these actual mechanisms can be hypothesized. At take-off power, the blunted leading edge increases the strength of the bow stock thereby producing a state where noise generated behind the shock will have greater difficulties traveling forward. The stronger bow shock also results in a lower passage (blade) Mach number which produces lower broad band noise.

At approach power settings, the pressure fields on the leading edge of the fan rotor are intensified by blunting at least the tip of the blade. This intensification produces a number of changes in local aerodynamics, such as redistribution of the flow and changes in local Mach number (pressure ratio and flow will decrease for a given fan rpm). This redistribution of flow evidently causes a reduction in broad band noise associated with the interaction of fan stream air and the leading edge of the fan rotor.

What we claim is:

1. In a gas turbine engine of the type which includes rotating turbomachinery, a combustion section, and an exhaust nozzle adapted to provide a propulsive force, the improvement comprising:

a turbomachinery rotor blade having a leading edge at least a portion of which includes blunting means for reducing the noise generated by rotation of said blade;

wherein said blunting means comprise an inflatable boot which surrounds at least a portion of said leading edge and means for supplying sufficient pressure behind said boot for slightly inflating same; and wherein said boot is expandable, upon inflation, substantially axially of the blade to vary the aerodynamic shape of the blade without varying its camber.

2. The improved turbomachinery rotor blade of claim 1 wherein said inflatable boot surrounds approximately the outer one-third of the blade radial height.

* * * * *